United States Patent [19]

Lee

[11] Patent Number: 5,748,338
[45] Date of Patent: May 5, 1998

[54] MANUAL SCANNING TYPE IMAGE SCANNER

[75] Inventor: Tangloo Lee, Yamato, Japan

[73] Assignee: SMK Corporation, Tokyo, Japan

[21] Appl. No.: 551,790

[22] Filed: Nov. 7, 1995

[30] Foreign Application Priority Data

Jul. 21, 1995 [JP] Japan .................................. 7-206735

[51] Int. Cl.$^6$ .......................... H04N 1/024; H04N 1/04; G06K 9/22
[52] U.S. Cl. ...................... 358/473; 358/497; 358/474; 382/313
[58] Field of Search ........................ 358/473, 497, 358/474; 382/313; 235/472

[56] References Cited

U.S. PATENT DOCUMENTS 5,497,150 3/1996 Kimura et al. ........................ 358/473

*Primary Examiner*—Edward L. Coles, Sr.
*Assistant Examiner*—Tia M. Harris
*Attorney, Agent, or Firm*—Morrison Law Firm

[57] ABSTRACT

A manual type image scanner rolls on X-direction and Y-direction rollers which support the scanner for translation in X and Y-directions, respectively. The scanner scans a surface while translated in the Y-direction. The X-direction roller is positioned on the scanner so that it is remote from a scanned surface when the scanner is supported on the Y-direction rollers. The position of the X-roller is such that the scanner can be supported on the X-direction rollers by tilting the scanner about one end of the Y-direction rollers until the X-direction roller contacts the surface and further tilting the scanner to lift the Y-direction rollers off the surface. Movements of the X-direction and Y-direction rollers are registered by encoders so that an area wider than an image width of the scanner can be scanned by consecutively scanning adjacent paths by making alternating traversals in the X- and Y-directions.

36 Claims, 9 Drawing Sheets

MANUAL SCANNING TYPE IMAGE SCANNER

BACKGROUND OF THE INVENTION

The invention relates to manual scanning-type image scanners and more particularly to scanners capable of scanning objects wider than the scanner itself.

Referring to FIG. 10, a manual image scanner operable with one hand has a cover 12 that fits into a housing 11. A switch 13 on cover 12 is pressed by a user to activate an illumination lamp 14. Illumination lamp 14 illuminates an object 15, such as a page of manuscript, to be scanned. Light reflected by object 15 passes through a slit 16. Mirrors 17 and 18 direct the reflected light to a lens 19. Lens 19 focuses the reflected light onto an image pickup element 20, such as a charged coupled device (CCD), supported by an image pickup element attachment plate 24. The formed image is detected by image pickup element 20 and converted into an electrical signal that is output by image pickup element 20.

A Y-direction roller 21 rotatably mounted along a forward end of housing 11 rolls in a Y direction on object 15 when the image scanner is pushed by the user. A distance-measuring shaft 22 rotates rearwardly of Y-direction roller 21. Distance and direction (forward versus backward) of movement of the image scanner are detected by an encoder, for example a conventional optical encoder comprising a shutter wheel 27 rotated by distance-measuring shaft 22 and a photointerrupter 23, which detects the rotation of shutter wheel 27. The distance and direction information is output by the scanner. A window 26 permits the user to see the field of view of the scanner to confirm the read-in position of the scanner.

The prior art scanner has the deficiency of being narrower than most objects intended to be scanned, such as a piece of paper, because the scanner cannot read in an image that is wider (the X-direction width) than the longitudinal direction of the slit 16 through which the reflected light enters the scanner.

Referring to FIGS. 11 and 12 a manual type image scanner designed to read in an image wider than the scanner is disclosed in Utility Model Publication HEI 5-20463 1993 and pending U.S. patent application Ser. No. 08/042,828 now U.S. Pat. No. 5,497,150. In this scanner, X-direction rollers 30, 30 in a housing 11 rotate on axes forming right angles with axes of Y-direction rollers 21, 21. One of X-direction rollers 30, 30 has an X-direction movement detector 29. When the scanner is pushed in the Y-direction, Y-direction rollers 21, 21 roll over an object 15 (for example, the page to be read in), as auxiliary scanning is performed, reading an image into the scanner. When pushbuttons 32, 32 are pressed in toward the center of housing 11, a movable part 31 carrying a pair of X-direction rollers 30, 30 is lowered toward a surface of object 15. Simultaneously, Y-direction rollers 21, 21 are raised away from the surface of object 15. With X-direction rollers 30, 30 lowered and Y-direction rollers 21, 21 raised, the scanner can move in the X-direction as X- direction rollers 30, 30 roll along object 15. The distance and direction of X-direction movement is detected by an X-direction movement detector 29. During X-direction movement, no image is read in. When the scanner has been moved a sufficient distance in the X-direction, Y-direction rollers 21, 21 are once again lowered to support the scanner on object 15 and X-direction rollers 30, 30, raised. The scanner is then pushed in the Y-direction as the image is further scanned in the Y direction. As the scanner moves in both the X- and Y-directions the image is read in as the scanner moves in the Y-direction and the coordinates (X and Y) are registered for both the X- and Y-directions by cumulating displacement signals output by X-direction and Y-direction movement detectors 29, 29. Note that the displacement information for both positive and negative translations are registered so coordinates for an entire area traversed by successive X- and Y-direction traversals can be calculated by a computer connected to receive the output of the scanner. The computer can thus join the portions scanned along each Y-direction traverse of the scanner to form a single image wider than the portion scanned in a single traverse. The construction of the scanners of FIGS. 11 and 12 are similar to that of the scanner of FIG. 10 except for the differences noted above and the provision of a Y-direction movement detector on only one of the Y-direction rollers 21, 21.

The X-Y manual type image scanner requires a bulky and complicated mechanism to raise and lower the X-direction rollers 30, 30 and the Y-direction rollers 21, 21 alternately. In addition, the mechanism has a large number of parts, is troublesome to assemble, and is expensive.

OBJECTS AND SUMMARY OF THE INVENTION

It is an object of the present invention to provide a manual scanner that is capable of scanning an image wider than the scanner.

It is another object of the present invention to provide a manual scanner that can read in an image that is wider than itself, without being bulky, costly or requiring a large number of parts.

Briefly a manual type image scanner rolls on X-direction and Y-direction rollers which support the scanner for translation in X and Y-directions, respectively. The scanner scans a surface while translated in the Y-direction. The X-direction roller is positioned on the scanner so that it is remote from a scanned surface when the scanner is supported on the Y-direction rollers. The position of the X-roller is such that the scanner can be supported on the X-direction rollers by tilting the scanner about one end of the Y-direction rollers until the X-direction roller contacts the surface and further tilting the scanner to lift the Y-direction rollers off the surface. Movements of the X-direction and Y-direction rollers are registered by encoders so that an area wider than an image width of the scanner can be scanned by consecutively scanning adjacent paths by making alternating traversals in the X- and Y-directions.

According to an embodiment of the present invention, there is provided, a scanner, comprising: a housing, an X-direction roller rotatably supported in a fixed position on the housing and a Y-direction roller rotatably supported in a fixed position on the housing, the Y-direction roller being positioned with respect to the housing so that the Y-direction roller can rest on a surface to support the housing and permit the housing to be rolled on the surface in a Y-direction supported by the Y-direction roller, the housing having an image digitizer, with an optical path, positioned in the housing to image and digitize a surface subtended by a width of the optical path, the X-direction roller being positioned with respect to the housing so that the X-direction roller is remote from the surface when the housing is supported on the Y-direction roller, the X-direction roller being positioned with respect to the housing so that the X-direction roller can rest on the surface to support the housing and permit the housing to be rolled on the surface in an X-direction supported by the X-direction roller and the X-direction being substantially perpendicular to the Y-direction.

According to another embodiment of the present invention, there is provided a scanner, comprising: a frame, an optical scanning mechanism on the frame, X- and Y-rollers rotatably mounted on the frame such that the frame can be supported above a surface on the X-roller, with the Y-roller positioned remote from the surface when the frame is held in a first orientation relative to the surface, and thereby rolled in an X-direction and the X- and Y-rollers mounted such that the frame can be supported on the Y-roller, with the X-roller positioned remote from the surface when the frame is held in a second orientation relative to the surface, and thereby rolled in an Y-direction.

According to still another embodiment of the present invention, there is provided a scanner, comprising: a frame, an optical mechanism connected to the frame having means for scanning a portion of a surface when the optical mechanism is translated in a Y-direction across the surface, the Y-direction being defined with respect to a position of the optical mechanism, the portion being a scan width wide and having a length corresponding to a distance of translation in the Y-direction, a Y-roller rotatably connected to the frame and positioned to support the frame when the frame is translated in the Y-direction, an X-roller rotatably connected to the frame and positioned to support the frame when the frame is translated in an X-direction, the X- and Y-rollers being positioned so that when the frame is rested on the Y-roller the X-roller is remote from the surface and so that the frame can be tilted through and acute angle with one end of the Y-roller lifting away from the surface as the frame rests on an opposite end of the Y-roller until the X-roller makes contact with the surface.

According to still another embodiment of the present invention, there is provided, a scanner, comprising: a frame, X- and Y-rollers rotatably mounted on the frame and an optical mechanism connected to the frame having means for scanning a portion of a surface when the optical mechanism is translated in a Y-direction across the surface, the Y-direction being defined with respect to a position of the optical mechanism, the portion being a scan width wide and having a length corresponding to a distance of translation in the Y-direction, the X- and Y-rollers rotating about respective axes that are mutually perpendicular, the Y-roller being positioned on the frame to permit the frame to be supported on the Y-roller to allow a Y-direction translation and attendant scanning of the portion of the surface, the X-roller being positioned on the frame so that the X-roller is remote from the surface, with the axis of the X-roller parallel to the surface, when the frame is supported on the Y-roller and the X-roller being positioned such that the frame may be supported on the X-roller with the Y-roller remote from the surface.

According to still another embodiment of the present invention, there is provided, a manual type image scanner, comprising: a housing, a scanner connected to the housing having means for scanning an image in a Y-direction, a Y-direction roller rotatably mounted on the housing and having means for supporting the housing above a surface to be scanned as the housing is translated in the Y-direction, an X-direction roller rotatably mounted on the housing with an axis perpendicular to an axis of the Y-direction roller, the X-direction roller being positioned in a corner of the housing so that a lowest point on its surface is higher than a lowest point of a surface of the Y-direction roller and at least part of the surface of the X-direction roller protruding from the housing such that the X-direction roller can support the housing allowing the housing to be rolled in an X-direction.

BRIEF DESCRIPTION OF THE DRAWINGS

FIG. 2 is a side view of the manual type image scanner of FIG. 1, with the cover on.

FIG. 3 is a front view of the manual type image scanner of FIG. 1, with the cover on.

DETAILED DESCRIPTION OF THE PREFERRED EMBODIMENTS

Figure 1:
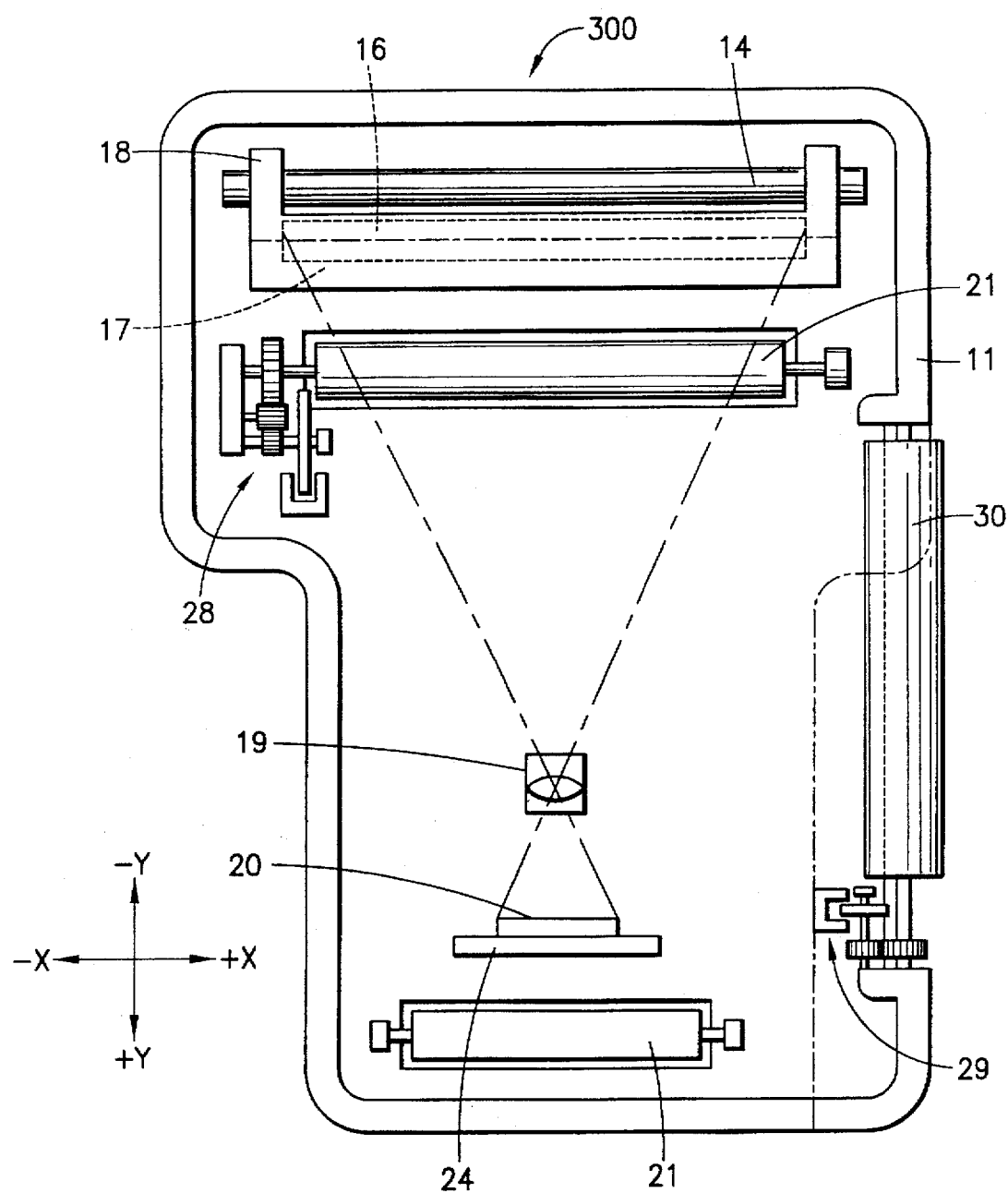
FIG. 1 is a top view of the manual type image scanner according to an embodiment of the invention, shown with a cover of the scanner removed.
Figure 2:
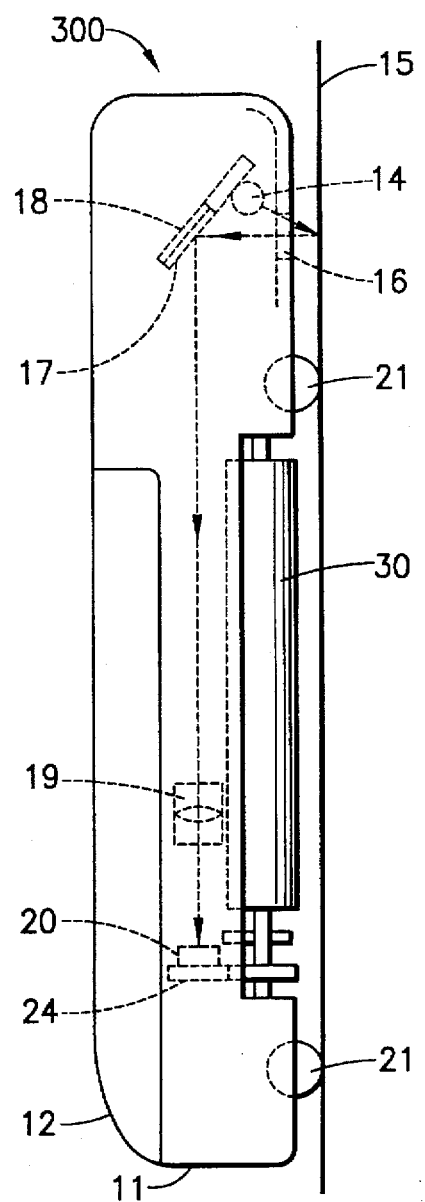
Figure 3:
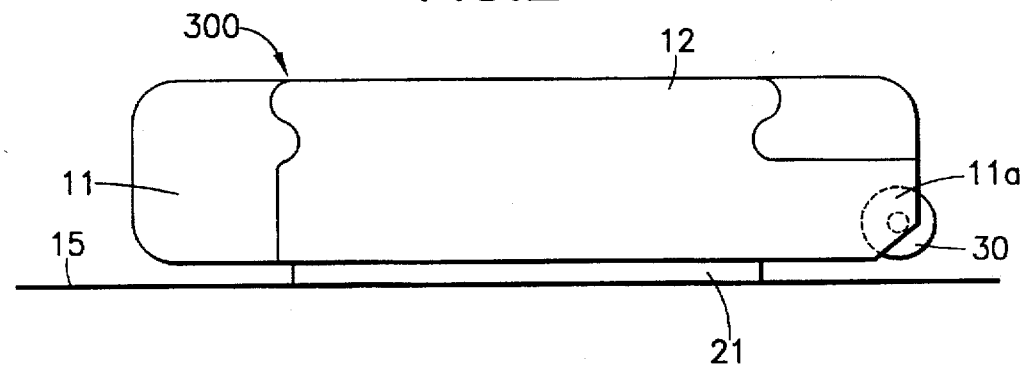

Referring to FIGS. 1–3 a manual type image scanner 300 according to a first embodiment of the invention scans an object 15, for example a page of printed matter to be digitized. Manual type image scanner 300 includes a housing 11, with a cover 12. An illumination lamp 14 illuminates object 15. Reflected light passes through a slit 16 and is reflected by a mirror 17 supported on the back surface of a mirror holder 18. The reflected light is imaged by a lens 19 onto an image pickup element 20, such as a CCD, which is supported on an image pickup element attachment plate 24. Y-direction rollers 21 support manual type image scanner 300 during Y-direction scanning of object 15. Angular displacement of Y-direction rollers 21 is registered by a Y-direction movement amount detector 28. X-direction roller 30 supports manual type image scanner 300 during X-direction scanning of object 15. Angular displacement of X-direction roller 30 is registered by an X-direction movement amount detector 29. Y-direction and X-direction movement amount detectors 28 and 29 can be optical encoders, electro-mechanical encoders, resistance encoders, or any suitable mechanism for indicating rotational displacement of X-direction and Y-direction rollers 30 and 21.

X-direction roller 30 is engaged differently from X-direction roller 30 of the prior art. According to the invention, X-direction roller 30 is located in a corner 11a of housing 11 with its lower surface positioned above the lower surface of Y-direction rollers 21 and at least part of its surface exposed beyond the side of housing 11 as shown in FIG. 3. This positioning insures that when manual type image scanner 300 is resting on Y-direction rollers 21, X-direction roller 30 is above the surface of object 15.

Figure 10:
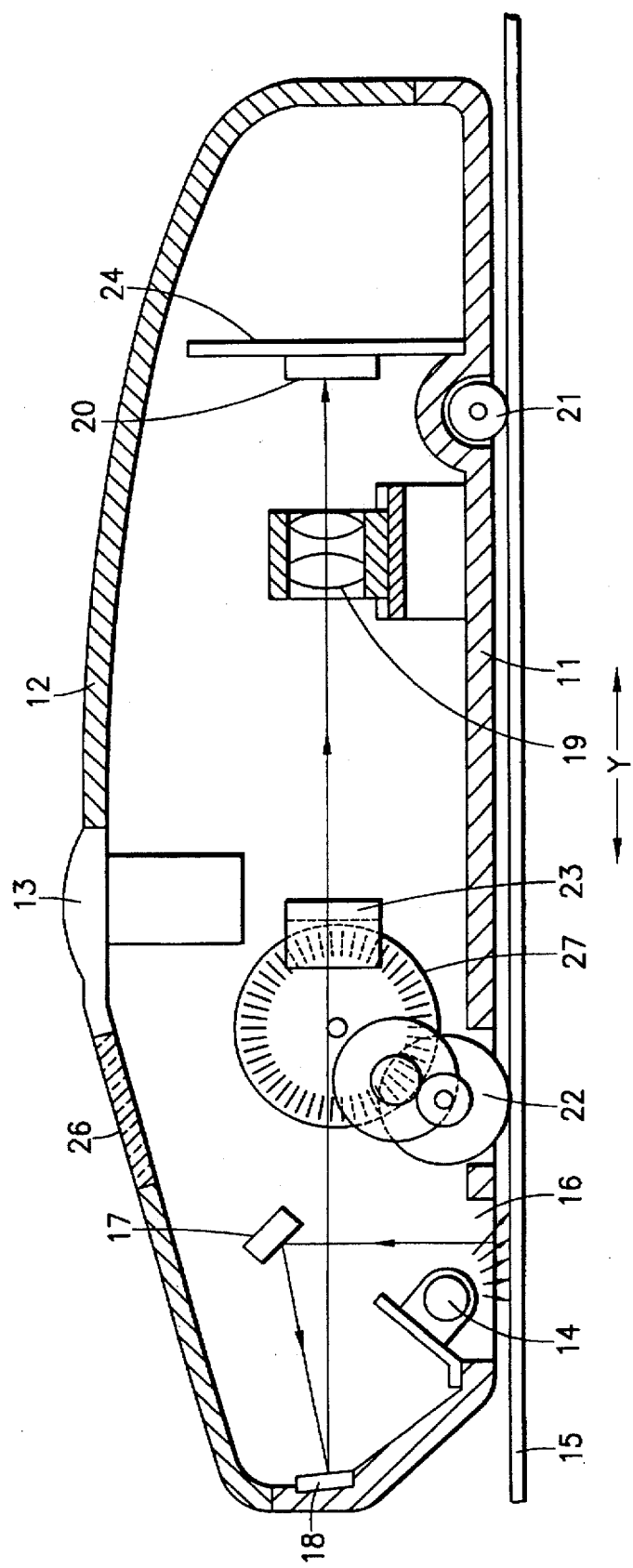
FIG. 10 is a cross-section view of a manual type image scanner according to the prior art.
Figure 11:
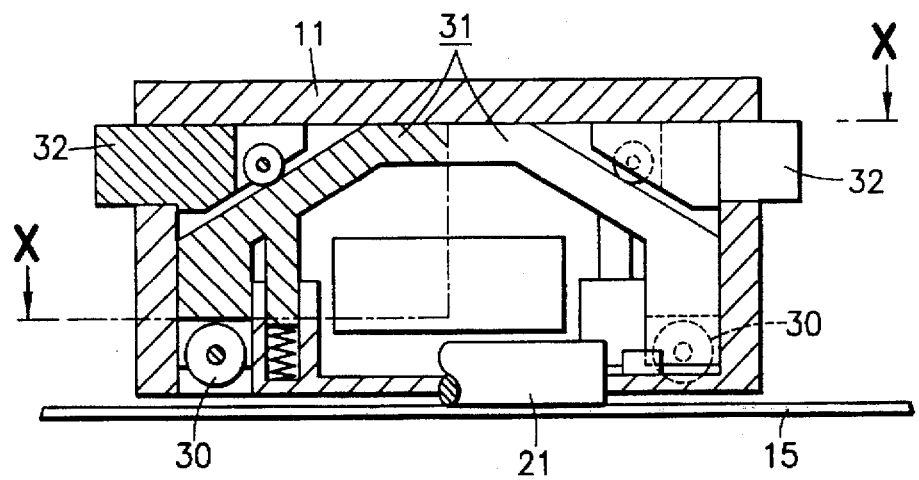
FIG. 11 is a cross-section view of the manual type scanner of FIG. 10.
Figure 12:
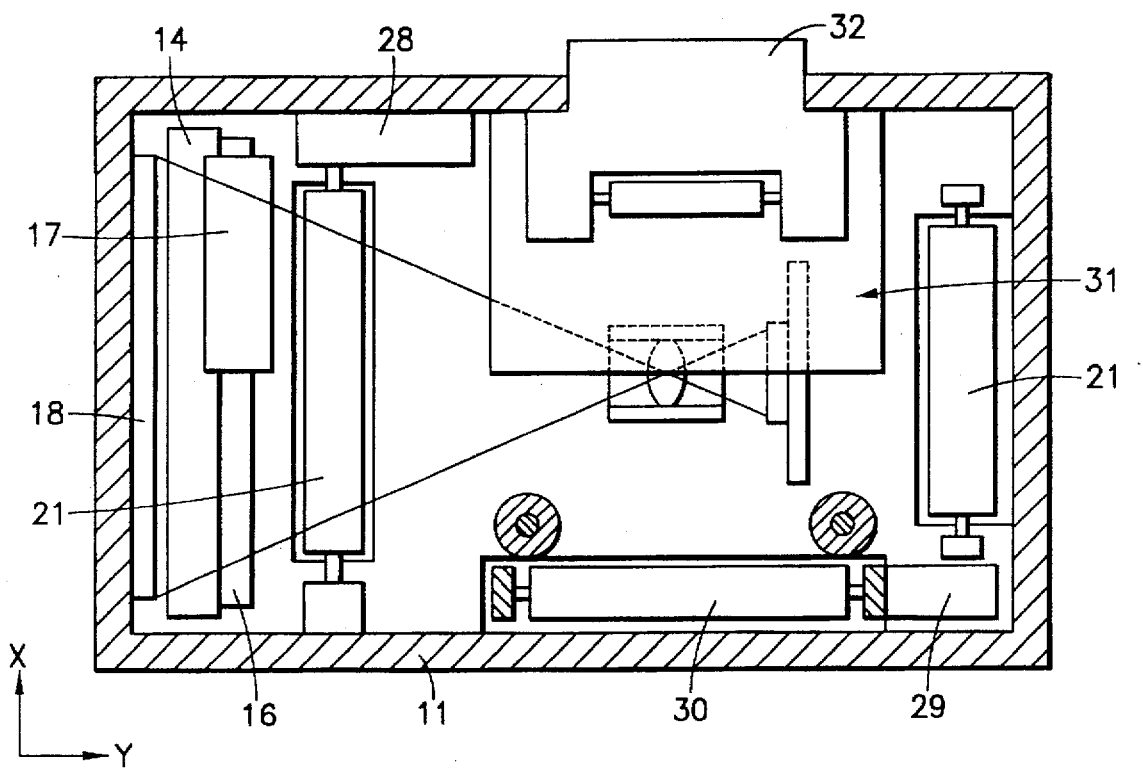
FIG. 12 is a cross-section view of the manual type scanner of FIGS. 10 and 11 with the section taken along line X—X.

An array-type roller (an array of independent concentric wheels rather than a roller) without an interconnection between the array elements may be used for whichever of the Y-direction rollers 21 is not equipped with Y-direction movement amount detector 28. In addition, although not shown in the diagram, manual type image scanner 300 has an internal switch for energizing illumination lamp 14 and initiating a reading-in operation. As in the prior art device of FIG. 10, manual type image scanner 300 has a finder for confirming the reading-in position.

Figure 4:
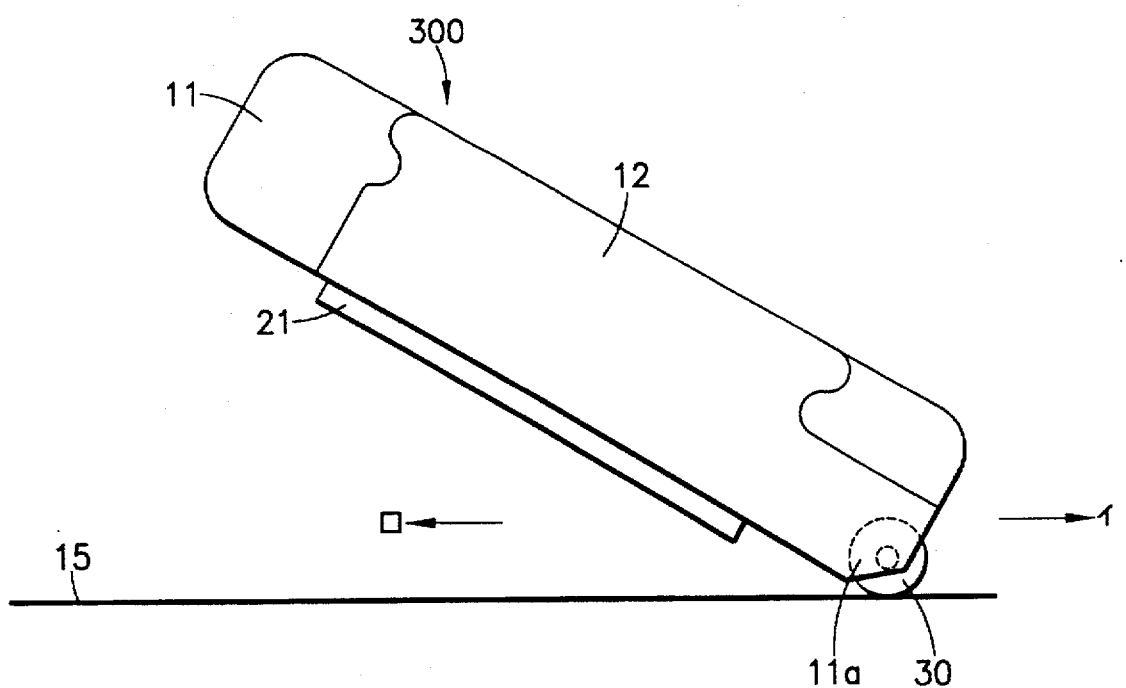
FIG. 4 is a front view of the manual type image scanner of FIG. 1 showing the scanner being moved in an X-direction.

Referring now also to FIG. 4, X-direction roller 30 of manual type image scanner 300 rolls on a fixed axis in a corner 11a of housing 11. The position of X-direction roller 30 permits manual type image scanner 300 to be rolled in the X-direction when manual type image scanner 300 is tilted as shown in FIG. 4. When manual type image scanner 300 is tilted, it rests on ends of Y-direction rollers 21 until X-direction roller 30 contacts object 15. This prevents manual type image scanner 300 from slipping in the X-direction before its X-direction movement can be registered by X-direction roller 30. Also note, as shown in FIG. 4, that the angle through which manual type image scanner 300 must be tilted is a relatively small acute angle. The small angle makes the changing of orientations of manual type image scanner 300 convenient to achieve and is preferred, although larger angles, even angles greater than 90 degrees, may be used.

When a side of manual type image scanner 300, opposite the side on which X-direction roller 30 is located, is lifted off the surface of object 15, X-direction roller 30 moves toward object 15, contacting object 15. The user can then tilt manual type image scanner 300 slightly further until Y-direction rollers 21 are lifted off the surface of object 15. Thus tilted, manual type image scanner 300 is fully supported on X-direction roller 30, permitting manual type image scanner 300 to be translated in the X-direction (the direction of the arrow of FIG. 4). During X-direction translation, X-direction movement amount detector 29 detects the rotational displacement and direction (positive or negative) of rotation of X-direction roller 30. Since Y-direction rollers 21 are not in contact with the surface of object 15 during the X-direction translation, Y-direction rollers 21 have no tendency to rotate, so no Y-direction displacement is registered.

With manual type image scanner 300 in its level position, supported on Y-direction rollers 21, the image can be scanned in the Y direction as Y-direction rollers 21 roll across object 15, because X-direction roller 30 is raised above object 15. When moved in this orientation in the Y-direction across object 15, X-direction rollers 30 do not rotate and no X-direction displacement is registered.

Figure 5A:
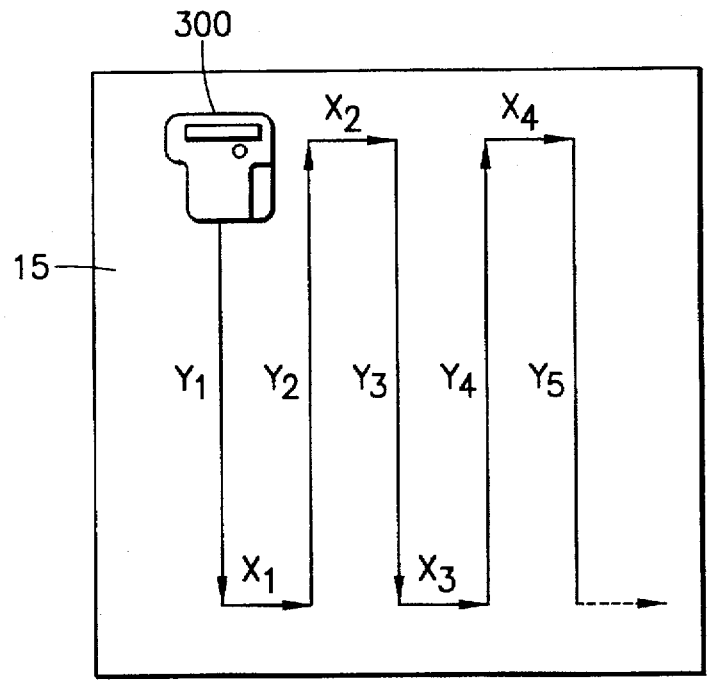
FIG. 5(a) is a top view of the scanner of FIG. 1 showing the path followed by the scanner in use when the image is scanned in a single X-direction beginning with one X-direction side of the scanned surface.
Figure 5B:
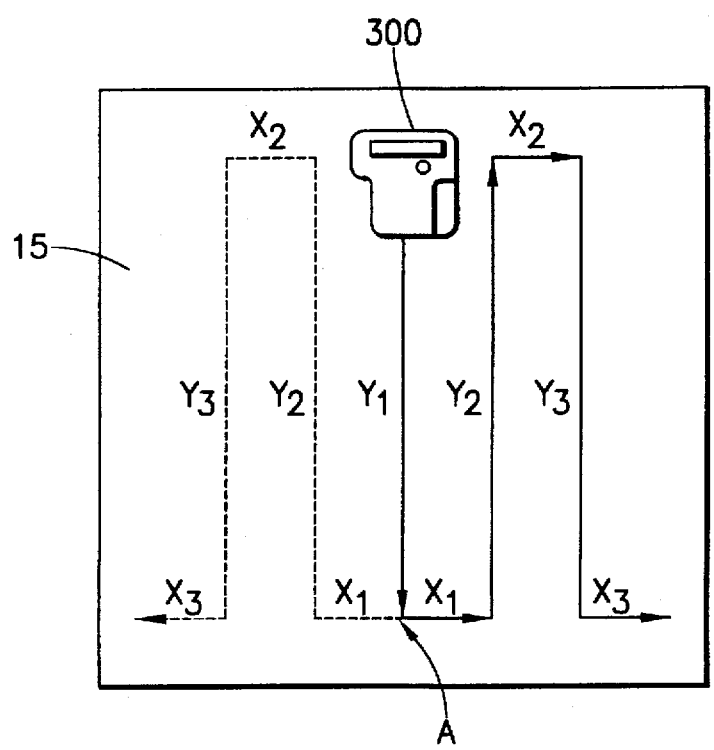
FIG. 5(b) is a top view of the scanner of FIG. 1 showing the path followed by the scanner when the image is scanned sequentially in two X-directions beginning from the center of the scanned surface and going toward the left and right sides of the surface.

Referring now also to FIGS. 5(a) and 5(b), manual type image scanner 300 according to the invention can be used to scan an object 15 wider than the scanner itself. That is to say, manual type image scanner 300 can read in a two-dimensional image that is wider than the greatest X-direction width that can be imaged by manual type image scanner 300 in a single pass. This is accomplished by scanning in the Y-direction in multiple passes for different X-direction positions. In a first method shown in FIG. 5(a), this is accomplished by scanning across the surface to be scanned in successive Y-direction traverses (Y1, Y2, ... Y5) between successive X-direction traverses (X1, X2, ... X4) beginning from the left side of the surface to be scanned. In another method, shown in FIG. 5(b), the scanning begins from the middle of the surface to be scanned and separate series of traverses are performed that bring the scanner first from the middle to one side of the surface and then from the middle to the other side.

In the first method of FIG. 5(a), the manual type image scanner 300 is first positioned in an upper left corner of object 15. From there manual type image scanner 300 is moved to a position in the lower left of the object 15 along path Y1 in the direction shown by the arrows. Next, manual type image scanner 300 is tilted to rest it on X-direction roller 30 and an X-direction traverse X1 performed that is equal to or less than a predetermined X-direction scan-width of manual type image scanner 300. Manual type image scanner 300 is then moved along traverse Y2 after rotating manual type image scanner 300 to rest on Y-direction rollers 21. The same actions are repeated to traverse a path X2, Y3, X3, Y4, X4, Y5, etc. until the entirety of object 15 is scanned. Note that each X-direction traverse is equal to or less than the predetermined X-direction scan-width of manual type image scanner so that the successive Y-direction scans can be stitched together to form a contiguous whole.

In the second method, shown in FIG. 5(b), manual type image scanner 300 is first positioned approximately in the upper center of the object 15, and from there successive Y and X-direction traverses performed to cover the right side of object 15. After scanning one side of the object, manual type image scanner 300 is translated in the X direction to the middle (in FIG. 5(b) this last traverse brings the scanner to the position indicated by the letter A) and another series of traverses as indicated by the dotted line of FIG. 5(b).

In either method, Y-direction and X-direction displacements are systematically recorded such that the coordinates of each scanned region can be mapped into a large area covered by all the successive traverses. This is because the entirety of coordinates (X,Y) of the image data read in during the Y-direction traverses Y1, Y2, Y2, etc. are correlated with position by cumulating relative displacements obtained from the X- and Y-direction displacement and direction data output by movement detectors 29 and 28 which are processed by a CPU (not shown). With this data, the CPU can join the separate scans into a single image.

The present invention eliminates the need for a complicated mechanism to lower and raise X-direction roller 30 and the Y-direction rollers 21, respectively. The advantages achieved are a reduction in size, complexity, cost, and number of parts.

In the above embodiments of the invention, scanning is performed by successive translations of the scanner from one side to the next, where Y-direction traverses are adjacent succeeding and preceding Y-direction traverses. However, manual type image scanner 300 can be used in other ways as well. For example, the image could be read in a spiral-shaped series of traverses, by jumping from one Y-direction traverse to another non-consecutively, by scanning from either end toward the middle, etc.

Figure 6A:
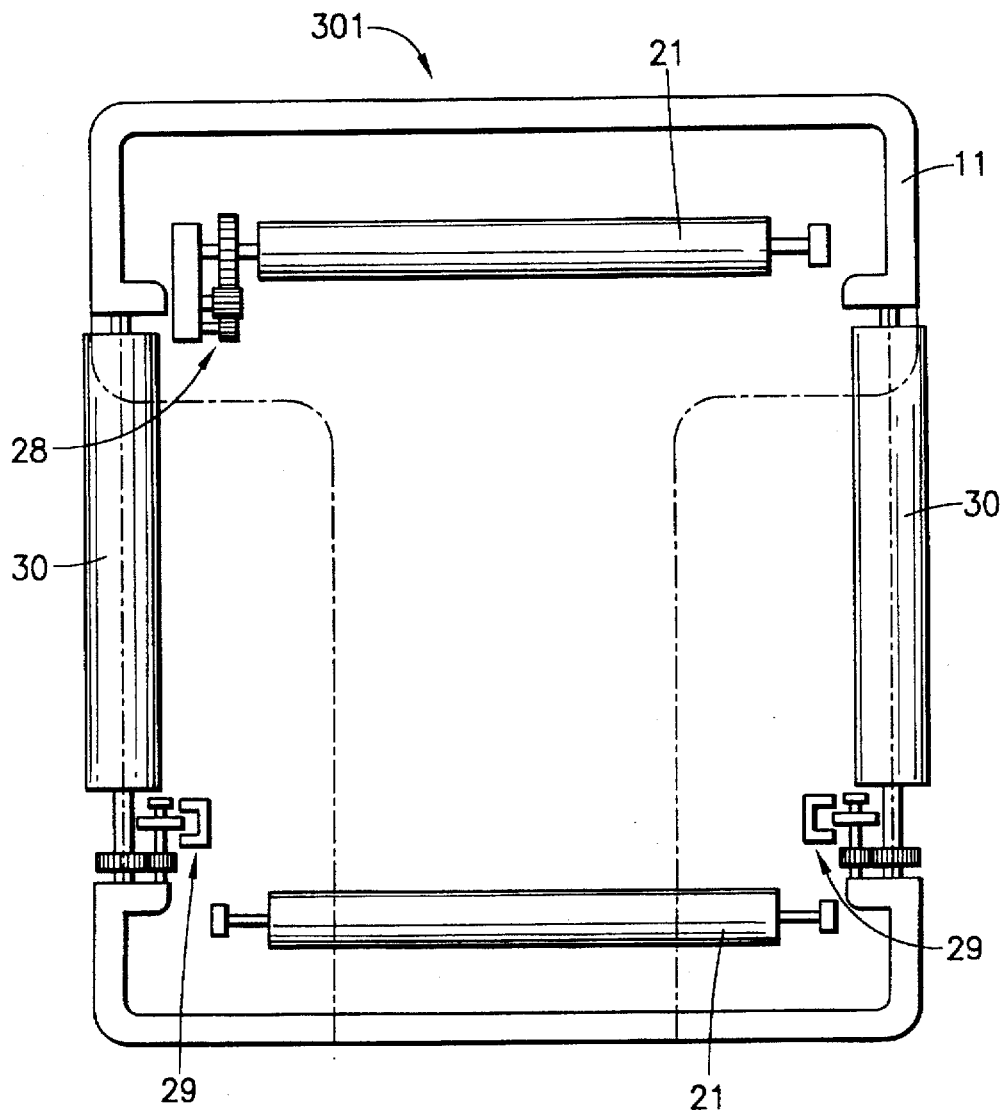
FIG. 6(a) is a top view of a manual type image scanner according to a second embodiment of the invention, with a cover of the scanner removed.
Figure 6B:
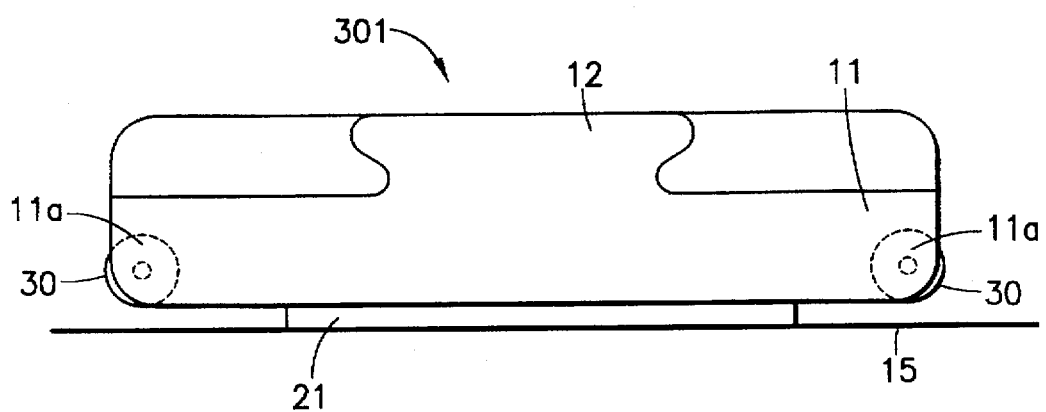
FIG. 6(b) is a front view of the manual type image scanner of FIG. 6(a) the cover of the scanner shown in position.
Figure 7A:
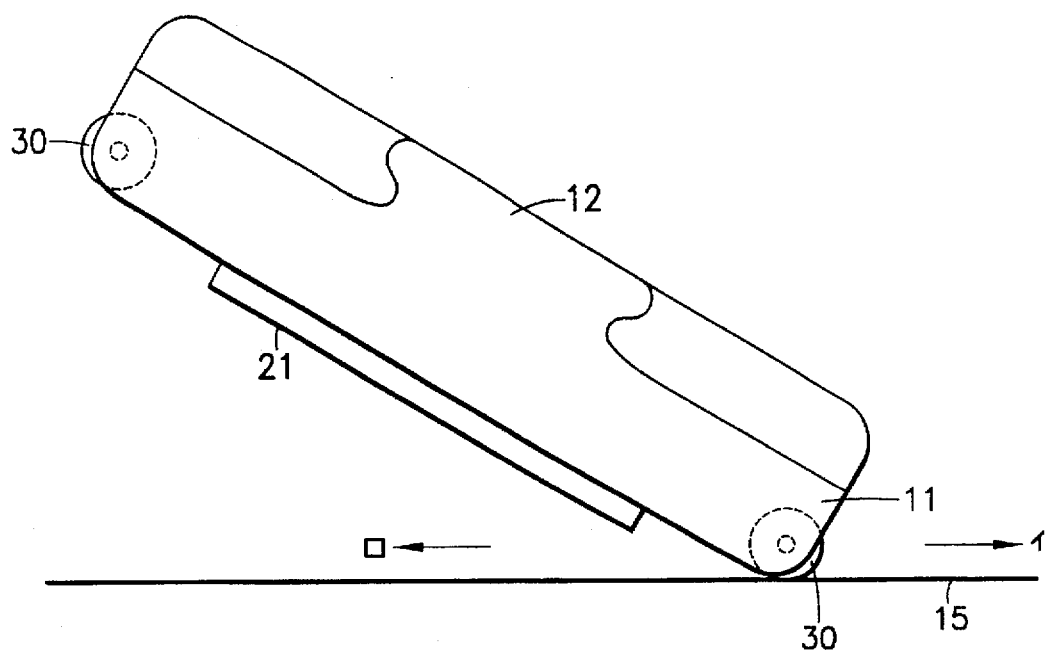
FIG. 7(a) shows how the scanner of FIGS. 6(a) and 6(b) is moved in the X-direction using a first X-direction roller.
Figure 7B:
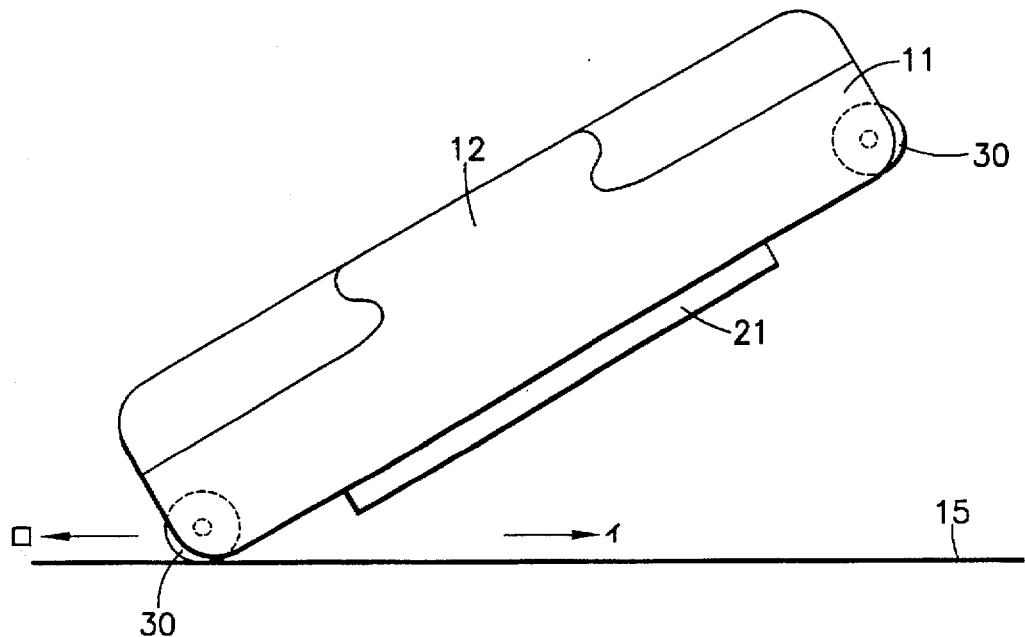
FIG. 7(b) shows how the scanner of FIGS. 6(a) and 6(b) is moved in the X-direction using a second X-direction roller.

Referring now to FIGS. 6(a) and 6(b), in a second embodiment of the invention a manual type image scanner 301 has a pair of X-direction rollers 30 arranged on opposite edges of the housing 11. With this arrangement, manual type image scanner 300 can be supported on either one of X-direction rollers 30 by tilting it in either direction 1 as shown in FIGS. 7(a) and 7(b). This makes manual type image scanner 301 more convenient to use in various situations. For example, if something is in the way that makes it difficult to tilt manual type image scanner 301 in one direction, it can be tilted in the other direction instead. In addition, if scanning has to be done close to the edge of an object such that one of the X-direction rollers 30 is off the edge of the object, the other X-direction roller 30 can be used. Also, traverses in the positive X-direction can be performed using one X-direction roller 30 and traverses in the negative X-direction can be performed using the other X-direction roller. This may make manual type image scanner 301 easier to handle in certain circumstances, for example, when a very large area is scanned while the user stands in a center position.

Figure 8:
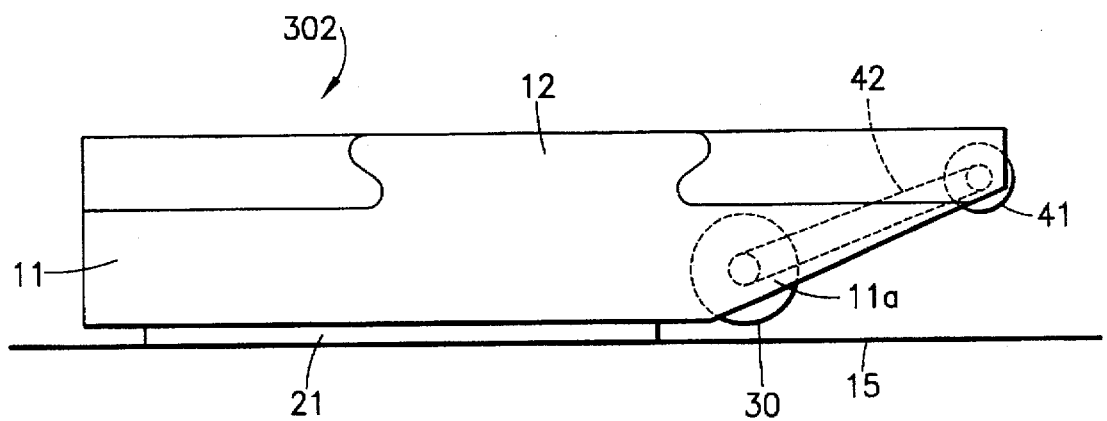
FIG. 8 is a front view of a manual type image scanner according to a third embodiment of the invention.
Figure 9:
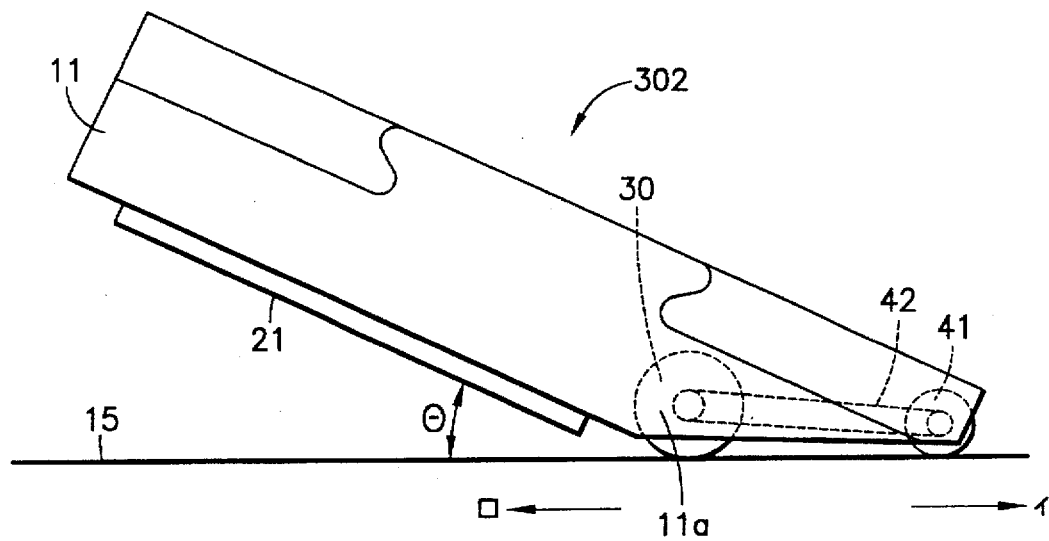
FIG. 9 is a front view of the manual type image scanner of FIG. 8.

Referring to FIGS. 8 and 9, a manual type image scanner 302 according to a third embodiment of the invention has an auxiliary roller 41 that rotates on an axis parallel to the axis on which X-direction roller 30 rotates. Auxiliary roller 41 is located diagonally above and toward the outside of housing 11 relative to X-direction roller 30. X-direction roller and auxiliary roller 41 may be interlocked by any suitable interlocking means 42 such as, for example, a belt or a gear so that they rotate together. X-direction roller and auxiliary roller 41 are positioned so that when manual type image scanner 302 is tilted as shown in FIG. 9, manual type image scanner 302 is supported on both X-direction roller 30 and auxiliary roller 41. In other respects, manual type image scanner 302 is the same as manual type image scanner 300.

When manual type image scanner 302 is supported on both X-direction roller 30 and auxiliary roller 41, manual type image scanner 302 can be moved in the positive X-direction and the negative X-direction as indicated by the arrows in FIG. 9. During X-direction translation of manual type image scanner 302, the X-direction roller 30 and the auxiliary roller 41 are both in contact with object 15 in two places. This makes manual type image scanner 302 stable because the tilt angle is constant. This can make precise positioning and handling of the manual type image scanner 302 easier. Note that during X-direction translation, the distance and direction of rotation of X-direction roller 30, are detected by X-direction movement amount detector 29 as in previously-described embodiments. The additional contact surface provided by the additional roller also helps to prevent accidental sliding, insuring that position data are reliable.

As with manual type image scanner 300, manual type image scanners 301 and 302 each hold the X-direction rollers (X-direction rollers 30 and auxiliary roller 41) in positions in which they do not impede movement of manual type image scanners 301 and 302 during traversals in the Y-direction. Simply tilting manual type image scanners 300, 301, and 302 to one side will disengage the Y-direction rollers and engage the X-direction rollers. With this configuration, the need, in a scanner made to scan objects larger than its single-pass imaging capability, for a complicated mechanism for lowering and raising X-direction rollers and Y-direction rollers is avoided.

Although in the embodiments described above, X-direction roller 30, Y-direction roller 21 and auxiliary roller 41 are shown as contiguous cylindrical elements, other configurations are intended to be embraced within the term "roller". These other configurations will also work with the invention. For example, a two-wheeled or multi-wheeled structure with a connection between the wheels, to insure straight traversals, may be used. In addition, although not ordinarily associated with the term "roller", tractors or other means for rollably supporting the scanner can be used. Such alternatives are considered to be within the compass of the present invention and to fall within the term "roller" as used in the claims.

Also, although in the embodiments described above, the scanner is supported on an end of Y-direction rollers 21 until X-direction rollers 30 contact surface 15, it is possible for the invention to be practiced with other configurations. For example, the scanner can be supported on an intermediate element such as a foot between the Y-direction rollers and the X-direction rollers as the scanner is tilted. In such a configuration, the scanner would be supported first on the ends of the Y-direction rollers, then tilted on the intermediate element, and then on the X-direction roller 30. Such alternatives are considered to be within the compass of the present invention.

What is claimed is:

1. A scanner, comprising:

a housing;

an X-direction roller rotatably supported in a fixed position on said housing; and a Y-direction roller rotatably supported in a fixed position on said housing;

said Y-direction roller being positioned with respect to said housing so that said Y-direction roller can rest on a surface to support said housing and permit said housing to be rolled on said surface in a Y-direction supported by said Y-direction roller;

said housing having an image digitizer, with an optical path, positioned in said housing to image and digitize a portion of said surface subtended by a width of said optical path;

said X-direction roller being positioned with respect to said housing so that said X-direction roller is remote from said surface when said housing is supported on said Y-direction roller;

said X-direction roller being positioned with respect to said housing so that said X-direction roller can rest on said surface to support said housing and permit said housing to be rolled on said surface in an X-direction supported by said X-direction roller; and said X-direction being substantially perpendicular to said Y-direction.

2. A scanner as in claim 1, wherein said X-direction roller rotates on a first axis and said Y-direction roller rotates on a second axis perpendicular to said first axis.

3. A scanner, comprising:

a housing;

an X-direction roller rotatably supported in a fixed position on said housing;

a Y-direction roller rotatably supported in a fixed position on said housing;

said Y-direction roller being positioned with respect to said housing so that said Y-direction roller can rest on a surface to support said housing and permit said housing to be rolled on said surface in a Y-direction supported by said Y-direction roller;

said housing having an image digitizer, with an optical path, positioned in said housing to image and digitize a portion of said surface subtended by a width of said optical path;

said X-direction roller being positioned with respect to said housing so that said X-direction roller is remote from said surface when said housing is supported on said Y-direction roller;

said X-direction roller being positioned with respect to said housing so that said X-direction roller can rest on said surface to support said housing and permit said housing to be rolled on said surface in an X-direction supported by said X-direction roller;

said X-direction being substantially perpendicular to said Y-direction;

said X-direction roller rotating on a first axis, and said Y-direction roller rotating on a second axis perpendicular to said first axis;

said Y-direction roller having an end; and said housing being shaped, and said Y-direction roller and said X-direction roller being located with respect to said housing, such that said scanner may be tilted while resting on said end of said Y-direction roller.

4. A scanner, comprising:

a housing;

an X-direction roller rotatably supported in a fixed position on said housing;

a Y-direction roller rotatably supported in a fixed position on said housing;

said Y-direction roller being positioned with respect to said housing so that said Y-direction roller can rest on a surface to support said housing and permit said housing to be rolled on said surface in a Y-direction supported by said Y-direction roller;

said housing having an image digitizer, with an optical path, positioned in said housing to image and digitize a portion of said surface subtended by a width of said optical path;

said X-direction roller being positioned with respect to said housing so that said X-direction roller is remote from said surface when said housing is supported on said Y-direction roller;

said X-direction roller being positioned with respect to said housing so that said X-direction roller can rest on said surface to support said housing and permit said housing to be rolled on said surface in an X-direction supported by said X-direction roller; and said X-direction being substantially perpendicular to said Y-direction;

said Y-direction roller having an end; and said housing being shaped, and said Y-direction roller and said X-direction roller being located with respect to said housing, such that said scanner may be tilted while resting on said end of said Y-direction roller.

5. A scanner as in claim 4, wherein:

said X-direction roller is positioned with respect to said housing so that said X-direction roller contacts said surface when said housing is tilted; and said housing is shaped, and said Y-direction roller and said X-direction roller are located with respect to said housing, such that said scanner may rest on said end of said Y-direction roller until said X-direction roller contacts said surface.

6. A scanner as in claim 5, wherein said X-direction roller rotates on a first axis and said Y-direction roller rotates on a second axis perpendicular to said first axis.

7. A scanner, comprising:

a frame;

an optical scanning mechanism on said frame;

X- and Y-rollers rotatably mounted on said frame such that said frame can be supported above a surface on said X-roller, with said Y-roller positioned remote from said surface when said frame is held in a first orientation relative to said surface, and thereby rolled in an X-direction;

said X- and Y-rollers mounted such that said frame can be supported on said Y-roller, with said X-roller positioned remote from said surface when said frame is held in a second orientation relative to said surface, and thereby rolled in a Y-direction; and said frame capable of being tilted through an acute angle to change an orientation of said frame from said first orientation to said second orientation.

8. A scanner, comprising:

a frame;

an optical scanning mechanism on said frame;

X- and Y-rollers rotatably mounted on said frame such that said frame can be supported above a surface on said X-roller, with said Y-roller positioned remote from said surface when said frame is held in a first orientation relative to said surface, and thereby rolled in an X-direction;

said X- and Y-rollers mounted such that said frame can be supported on said Y-roller, with said X-roller positioned remote from said surface when said frame is held in a second orientation relative to said surface, and thereby rolled in a Y-direction; and an optical system of said scanning mechanism;

said optical system being in a position such that said surface can be imaged by said optical system when said frame is supported on said Y-roller.

9. A scanner as in claim 8, further comprising:

another Y-roller rotatably mounted on said frame;

said Y-roller and said another Y-roller having parallel axes of rotation.

10. A scanner as in claim 9, further comprising:

an optical system of said scanning mechanism;

said optical system being in a position such that said surface can be imaged by said optical system when said frame is supported on said Y-roller and said another Y-roller.

11. A scanner as in claim 10, wherein said X-roller rotates about a first axis and said Y-roller rotates about a second axis, said first axis being perpendicular to said second axis.

12. A scanner, comprising:

a frame;

an optical scanning mechanism on said frame;

X- and Y-rollers rotatably mounted on said frame such that said frame can be supported above a surface on said X-roller, with said Y-roller positioned remote from said surface when said frame is held in a first orientation relative to said surface, and thereby rolled in an X-direction;

said X- and Y-rollers mounted such that said frame can be supported on said Y-roller, with said X-roller positioned remote from said surface when said frame is held in a second orientation relative to said surface, and thereby rolled in a Y-direction;

another Y-roller rotatably mounted on said frame;

said Y-roller and said another Y-roller having parallel axes of rotation;

said X-roller being rotatable about a first axis and said Y-roller being rotatable about a second axis, said first axis being perpendicular to said second axis; and said frame capable of being tilted through an acute angle to change an orientation of said frame from said first orientation to said second orientation.

13. A scanner, comprising:

a frame;

an optical scanning mechanism on said frame;

X- and Y-rollers rotatably mounted on said frame such that said frame can be supported above a surface on said X-roller, with said Y-roller positioned remote from said surface when said frame is held in a first orientation relative to said surface, and thereby rolled in an X-direction;

said X- and Y-rollers mounted such that said frame can be supported on said Y-roller, with said X-roller positioned remote from said surface when said frame is held in a second orientation relative to said surface, and thereby rolled in a Y-direction;

another X-roller rotatably mounted on said frame;

said X-roller and said another X-roller having parallel axes of rotation;

said X-roller and said another X-roller simultaneously supporting said frame in said second orientation; and said frame capable of being tilted through an acute angle to change an orientation of said frame from said first orientation to said second orientation.

14. A scanner as in claim 13, wherein said another X-roller is positioned such that said another X-roller is positioned and oriented with respect to said frame such that said frame can be supported on said another X-roller, with said Y-roller positioned remote from said surface, when said frame is held in a third orientation relative to said surface, and thereby rolled in said X-direction.

15. A scanner as in claim 14, wherein said frame is tilted through another acute angle to change an orientation of said frame from said first orientation to said third orientation.

16. A scanner as in claim 15, wherein said another acute angle is in an opposite direction from said acute angle.

17. A scanner, comprising:

a frame;

an optical scanning mechanism on said frame;

X- and Y-rollers rotatably mounted on said frame such that said frame can be supported above a surface on said X-roller, with said Y-roller positioned remote from said surface when said frame is held in a first orientation relative to said surface, and thereby rolled in an X-direction;

said X- and Y-rollers mounted such that said frame can be supported on said Y-roller, with said X-roller positioned remote from said surface when said frame is held in a second orientation relative to said surface, and thereby rolled in a Y-direction;

another X-roller rotatably mounted on said frame;

said X-roller and said another X-roller having parallel axes of rotation;

said another X-roller being positioned such that said another X-roller mounted on said frame can support said frame, with said Y-roller positioned remote from said surface, when said frame is held in a third orientation relative to said surface, and thereby rolled in said X-direction.

18. A scanner, comprising:

a frame;

an optical mechanism connected to said frame having means for scanning a portion of a surface when said optical mechanism is translated in a Y-direction across said surface;

said Y-direction being defined with respect to a position of said optical mechanism;

said portion being a scan width wide and having a length corresponding to a distance of translation in said Y-direction;

a Y-roller rotatably connected to said frame and positioned to support said frame when said frame is translated in said Y-direction;

an X-roller rotatably connected to said frame and positioned to support said frame when said frame is translated in an X-direction;

said X- and Y-rollers being positioned so that when said frame is rested on said Y-roller said X-roller is remote from said surface and so that said frame can be tilted through an acute angle with one end of said Y-roller lifting away from the surface as said frame rests on an opposite end of said Y-roller until said X-roller makes contact with said surface.

19. A scanner as in claim 18, wherein said X- and Y-rollers are positioned such that a further tilting of said frame will cause said opposite end of said Y-roller to lift away from said surface and permit said frame to rest entirely on said X-roller.

20. A scanner as in claim 19, wherein said X-direction roller rotates on a first axis and said Y-direction roller rotates on a second axis perpendicular to said first axis.

21. A scanner as in claim 18, wherein said X-roller rotates on a first axis and said Y-roller rotates on a second axis perpendicular to said first axis.

22. A scanner as in claim 18, further comprising:

an optical system of said scanning mechanism;

said optical system being in a position such that said surface can be imaged by said optical system when said frame is supported on said Y-roller.

23. A scanner as in claim 22, further comprising:

another Y-roller rotatably mounted on said frame;

said Y-roller and said another Y-roller having parallel axes of rotation.

24. A scanner as in claim 23, further comprising:

an optical system of said scanning mechanism;

said optical system being in a position such that said surface can be imaged by said optical system when said frame is supported on said Y-roller and said another Y-roller.

25. A scanner as in claim 24, wherein said X-roller rotates about a first axis and said Y-roller rotates about a second axis, said first axis being substantially perpendicular to said second axis.

26. A scanner as in claim 18, further comprising:

another Y-roller rotatably mounted on said frame;

said Y-roller and said another Y-roller having parallel axes of rotation.

27. A scanner as in claim 26, wherein said X-roller rotates about a first axis and said Y-roller rotates about a second axis, said first axis being perpendicular to said second axis.

28. A scanner as in claim 18, further comprising:

another X-roller rotatably mounted on said frame;

said X-roller and said another X-roller having parallel axes of rotation.

29. A scanner as in claim 28, wherein said X-roller and said another X-roller simultaneously support said frame when said frame is tilted through said acute angle.

30. A scanner as in claim 29, wherein said another X-roller is positioned such that said another X-roller mounted on said frame such that said frame can be supported on said another X-roller, with said Y-roller and said X-roller positioned remote from said surface.

31. A scanner, comprising:

a frame;

an X-roller and a pair of Y-rollers rotatably mounted in fixed positions on said frame;

an optical mechanism connected to said frame having means for scanning a portion of a surface when said optical mechanism is translated in a Y-direction across said surface;

said Y-direction being defined with respect to a position of said optical mechanism;

said portion being a scan width wide and having a length corresponding to a distance of translation in said Y-direction;

said X-roller and said pair of Y-rollers rotating about respective axes that are mutually perpendicular;

said pair of Y-rollers being positioned on said frame to permit said frame to be supported on said pair of Y-rollers to allow a Y-direction translation and attendant scanning of said portion of said surface;

said X-roller being positioned on said frame so that said X-roller is remote from said surface, with said axis of said X-roller parallel to said surface, when said frame is supported on said pair of Y-rollers; and said X-roller being positioned such that said frame may be supported on said X-roller with said pair of Y-rollers remote from said surface.

32. A scanner, comprising:

a frame;

X- and Y-rollers rotatably mounted on said frame;

an optical mechanism connected to said frame having means for scanning a portion of a surface when said optical mechanism is translated in a Y-direction across said surface;

said Y-direction being defined with respect to a position of said optical mechanism;

said portion being a scan width wide and having a length corresponding to a distance of translation in said Y-direction;

said X- and Y-rollers rotating about respective axes that are mutually perpendicular;

said Y-roller being positioned on said frame to permit said frame to be supported on said Y-roller to allow a Y-direction translation and attendant scanning of said portion of said surface;

said X-roller being positioned on said frame so that said X-roller is remote from said surface, with said axis of said X-roller parallel to said surface, when said frame is supported on said Y-roller;

said X-roller being positioned such that said frame may be supported on said X-roller with said Y-roller remote from said surface;

said Y-roller having first and second opposite ends; and said frame capable of being supported on said X-roller by tilting said frame about said first end through an angle, said frame being supported on said first end as said frame is tilted, until said X-roller contacts said surface and continuing said tilting until said Y-roller is lifted away from said surface.

33. A scanner as in claim 32, wherein said angle is an acute angle.

34. A manual type image scanner, comprising:

a housing;

a scanner connected to said housing having means for scanning an image in a Y-direction;

a Y-direction roller rotatably mounted on said housing and having means for supporting said housing above a surface to be scanned as said housing is translated in said Y-direction;

an X-direction roller rotatably mounted on said housing with an axis perpendicular to an axis of said Y-direction roller;

said X-direction roller being positioned in a corner of said housing so that a lowest point on its surface is higher than a lowest point of a surface of said Y-direction roller; and at least part of said surface of said X-direction roller protruding from said housing such that said X-direction roller can support said housing allowing said housing to be rolled in an X-direction.

35. A manual type image scanner as in claim 34 further comprising an additional X-direction roller located on a side of said housing opposite said X-direction roller.

36. A manual type image scanner as in claim 34 further comprising an auxiliary X-direction roller rotatably mounted on said housing such that both said X-direction roller and said auxiliary X-direction roller can support said housing to permit said housing to be rolled in said X-direction.

* * * * *